United States Patent [19]

Lin

[11] Patent Number: 4,987,653

[45] Date of Patent: Jan. 29, 1991

[54] BAND RETAINING UNIT HAVING A MULTI-LOCK EFFECT

[76] Inventor: Shu-Huang Lin, No. 99, Lane 50, Hsin Ping Road, Taiping Hsiang, Taichung, Taiwan

[21] Appl. No.: 512,177

[22] Filed: Apr. 20, 1990

[51] Int. Cl.⁵ ............................................. A44B 21/00
[52] U.S. Cl. .................................. 24/68 CD; 24/68 E
[58] Field of Search ............... 24/68 CD, 68 E, 68 R, 24/71.2, 311

[56] References Cited

U.S. PATENT DOCUMENTS

| | | | |
|---|---|---|---|
| 2,997,761 | 8/1961 | Davis | 24/68 E |
| 3,099,055 | 7/1963 | Huber | 24/68 CD |
| 3,252,188 | 5/1966 | Davis | 24/68 E |
| 3,703,024 | 11/1972 | Johnson | 24/68 CD |
| 4,464,811 | 8/1984 | Holmes | 24/68 CD |
| 4,796,336 | 1/1989 | Scully | 24/68 CD |

*Primary Examiner*—Victor N. Sakran
*Attorney, Agent, or Firm*—Finnegan, Henderson, Farabow, Garrett & Dunner

[57] ABSTRACT

A band retaining unit includes a female retaining body adapted to be mounted securely on a canvas, a male retaining body connected pivotally to the female retaining body, a gripping element disposed slidably on the male retaining body, and a spring element biasing the engagement arms of the gripping element to engage within the gripping notches of the female retaining body, so as to clamp tightly a retaining band between the male retaining body and the female retaining body. The gripping element is provided with a projection which is positioned so that when a rope is passed through the rope holes of the female retaining body and into the depressions of the male retaining body, the projection is obstructed by the rope from moving in the band retaining unit, thereby locking the gripping element on the female retaining body.

1 Claim, 7 Drawing Sheets

BAND RETAINING UNIT HAVING A MULTI-LOCK EFFECT

BACKGROUND OF THE INVENTION

This invention relates to a band retaining unit which releasably locks a retaining band thereon, so that the user can manually adjust the retaining band and tauten the portion of the retaining band between two articles, which are respectively fastened to the band retaining unit and the retaining band, more particularly to a band retaining unit having a multi-lock effect.

Usually a canvas is used to cover a freight container and fastened to the same by a plurality of bands and band retaining units. Referring to FIGS. 1, 2, a conventional band retaining unit of this kind includes a female retaining body 11, a male retaining body 12 connected rotatably to the female retaining body 11 by a pivot 121, a gripping element 13, and a spring element 14. The female retaining body 11 is riveted to a canvas 71 (see FIG. 3). The female retaining body 11 includes a base wall with two holes 111, 112, and two side walls, each of which has a gripping notch 113 and a rope hole 114. The male retaining body 12 includes two side walls, each of which has a slide slot 122 aligned with the gripping notches 113, and a depression 123 aligned with the rope holes 114. The gripping element 13 includes two engagement arms 130 inserted slidably into the slide slots 122 of the male retaining body 12. A generally triangular gap 131 is defined between the engagement arms 130 of the gripping element 13. A connector 132 interconnects the engagement arms 130 of the gripping element 13 so as to prevent deformation of the engagement arms 130. The spring element 14 biases the engagement arms 130 of the gripping element 13 to engage within the gripping notches 113 of the female retaining body 11, so as to prevent separation of the male retaining body 12 from the female retaining body 11, thereby clamping tightly a retaining band 15 between the female retaining body 11 and the male retaining body 12. The retaining body 15 is fastened to a retaining hook 151 at an end thereof, which is held on the rail 72 (see FIG. 3) of a freight container 7 (see FIG. 3). A rope 8 (see FIG. 3) is passed through the rope holes 114 of the female retaining body 11 and into the depressions 123 of the male retaining body 12, so as to confine the male retaining body 12 between the female retaining body 11 and the rope 8, thereby ensuring the engagement of the free end of the male retaining body 12 within the free end of the female retaining body 11. When the rope 8 is removed from the rope hole 114 and the engagement arms 130 of the gripping element 13 are removed from the gripping notches 113, the male retaining body 12 can be rotated to disengage the free end of the male retaining body 12 from the free end of the female retaining body 11, so that the retaining body 15 can be adjusted, thereby enabling the portion of the retaining band 15 between the band retaining unit and the retaining hook 151 to be tautened. The engagement of the arms 130 within the notches 113 and the extension of the rope 8 through the rope holes 114 form a double lock of the male retaining body 12 on the female retaining body 11. In practice, however, this double lock is dissatisfactory.

SUMMARY OF THE INVENTION

It is therefore the main object of this invention to provide a band retaining unit which has a multi-lock effect.

According to this invention, a band retaining unit includes a female retaining body adapted to be mounted securely on a canvas, a male retaining body connected pivotally to the female retaining body, a gripping element disposed slidably on the male retaining body, and a spring element biasing the engagement arms of the gripping element to engage within the gripping notches of the female retaining body, so as to clamp tightly a retaining band between the male retaining body and the female retaining body. The gripping element is provided with a projection, which is positioned so that when a rope is passed through the rope holes of the female retaining body and into the depressions of the male retaining body, the projection is obstructed by the rope and cannot move in the band retaining unit, thereby locking the gripping element on the female retaining body.

BRIEF DESCRIPTION OF THE DRAWING

Other features and advantages of this invention will become apparent in the following detailed description of a preferred embodiment of this invention, with reference to the accompanying drawings, in which.

DETAILED DESCRIPTION OF THE PREFERRED EMBODIMENT

Figure 4:
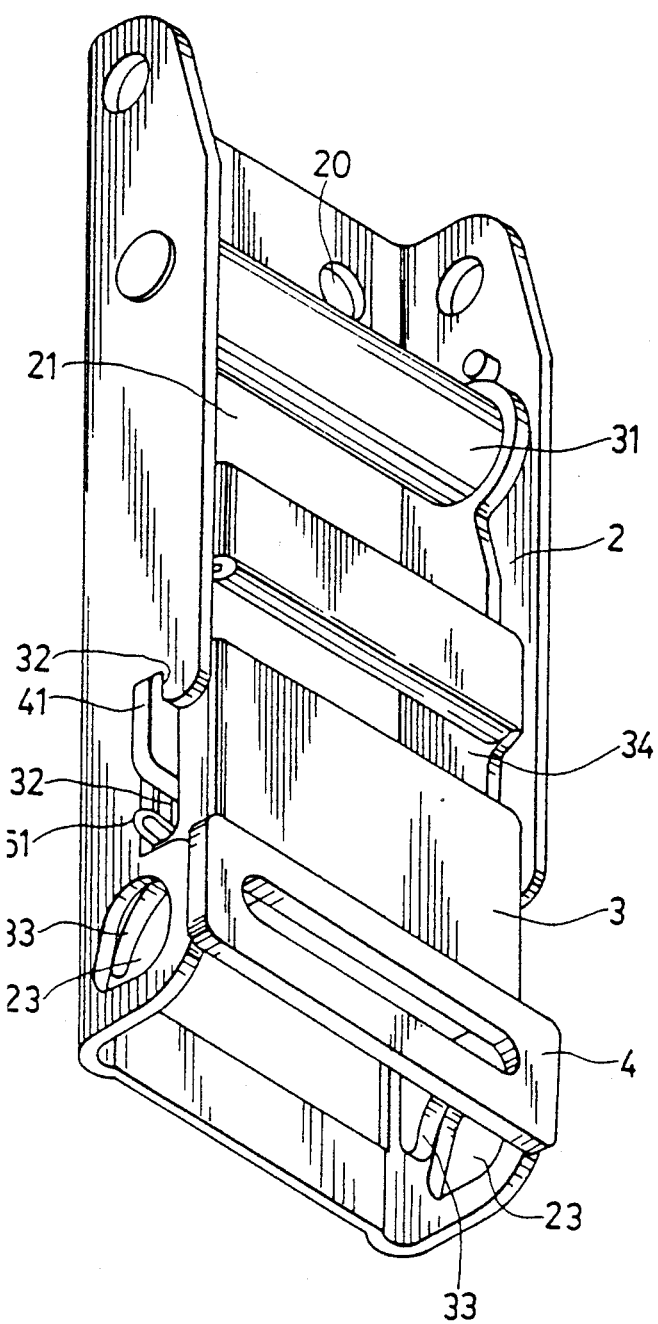
FIG. 4 is a perspective view of a band retaining unit according to this invention in a locking position.
Figure 5:
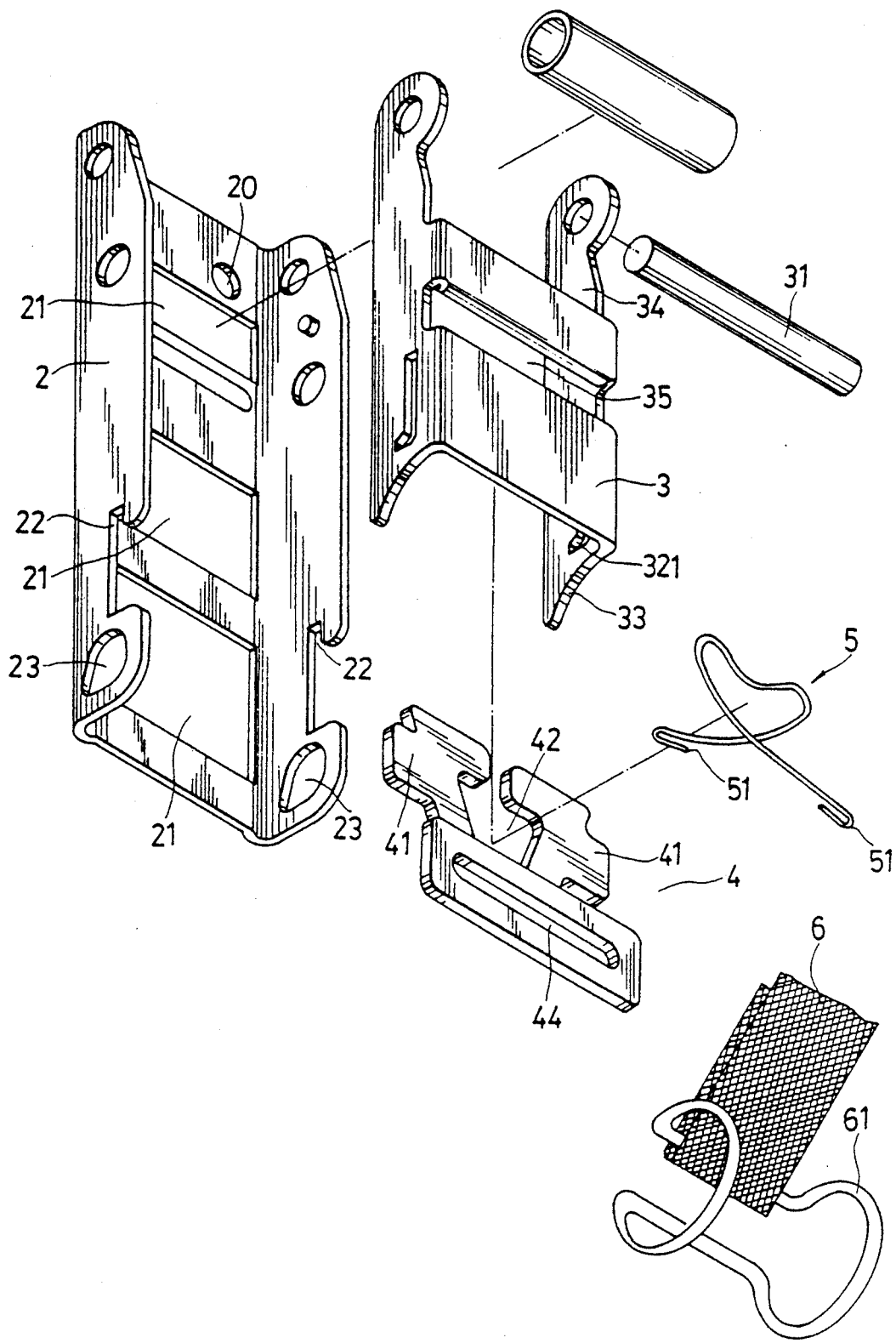
FIG. 5 is an exploded view showing the band retaining unit of this invention.
Figure 6:
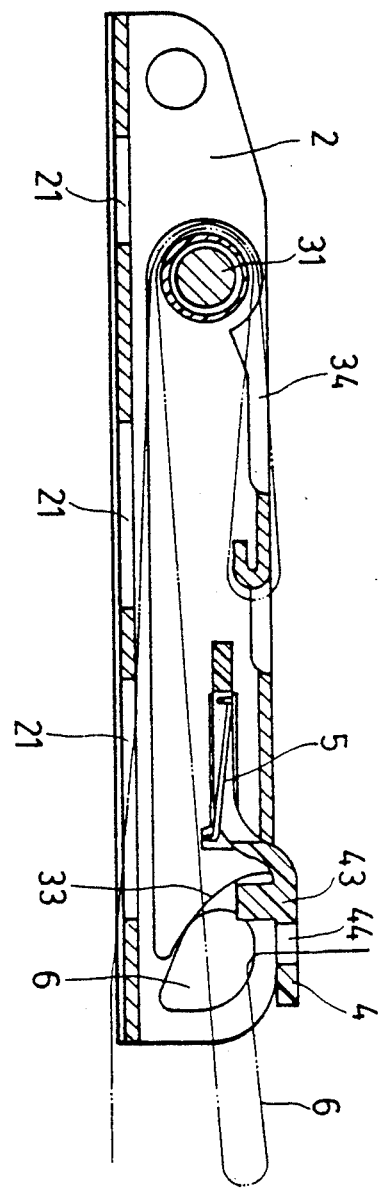
FIG. 6 is a sectional view showing the band retaining unit of this invention in a locking position.

Referring to FIGS. 4 to 6, a band retaining unit of this invention includes a female retaining body 2, a male retaining body 3, a gripping element 4, and a spring element 5. Each of the female retaining body 2 and the male retaining body 3 is generally U-shaped and has a base wall and two parallel side walls.

The base wall of the female retaining body 2 has a fastener hole 20 whereby the female retaining body 2 can be riveted to a canvas, which is used to cover a freight container. Three large openings 21 are formed through the base wall of the female retaining body 2 so as to reduce the weight of the band retaining unit. Each of the side walls of the female retaining body 2 has a gripping notch 22 and a rope hole 23 positioned under the gripping notch 22.

The male retaining body 3 is connected rotatably to the female retaining body 2 by a pivot 31. Each of the side walls of the male retaining body 3 has a slide slot 32 aligned with the gripping notches 22 of the female retaining body 2, and a depression 33 aligned with the rope holes 23 of the female retaining body 2. An upper opening 34 and a lower opening 35 are formed through the base wall of the male retaining body 3.

Figure 7:
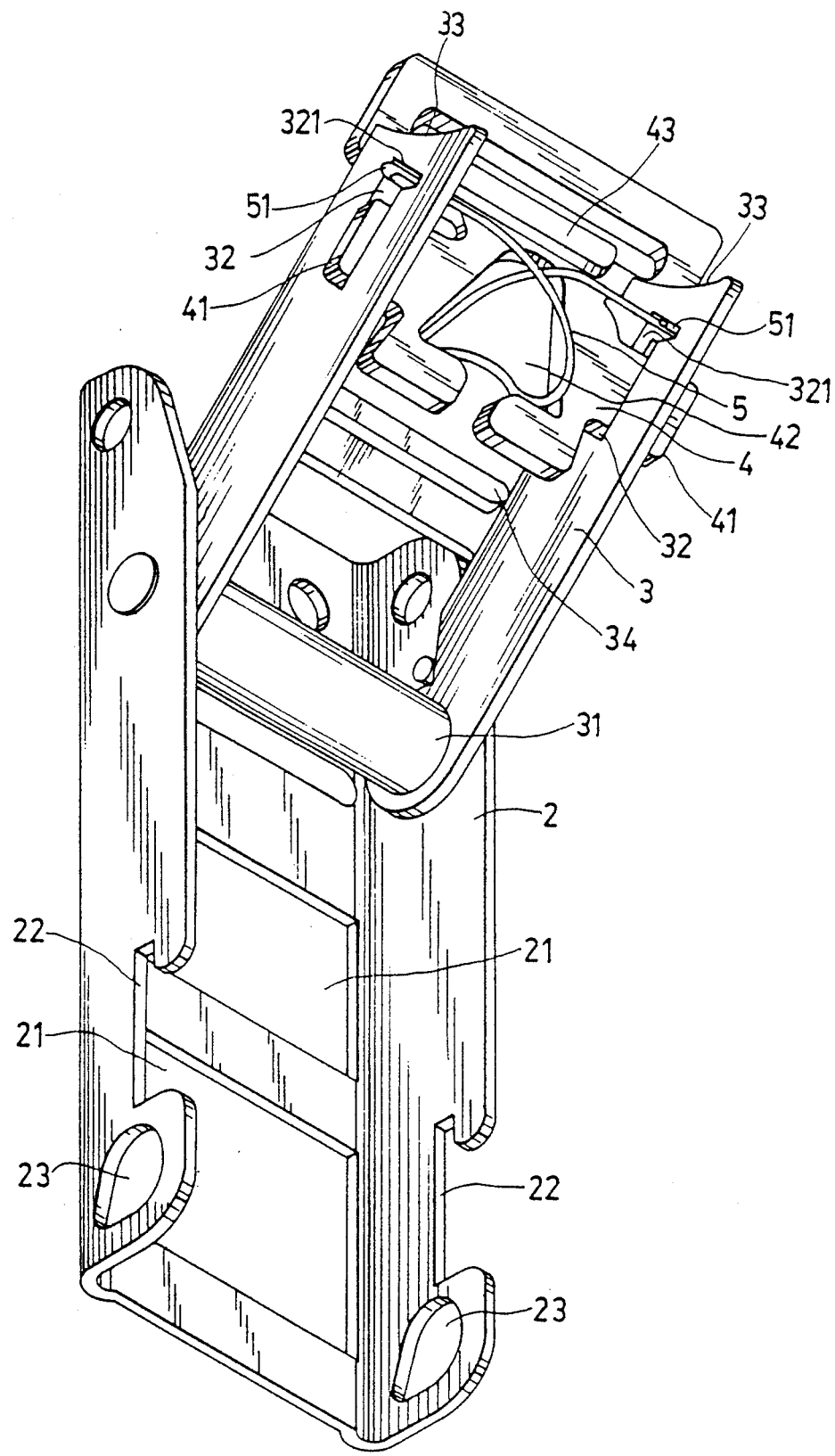
FIG. 7 is a perspective view showing the band retaining unit of this invention in an unlocking position.
Figure 1:
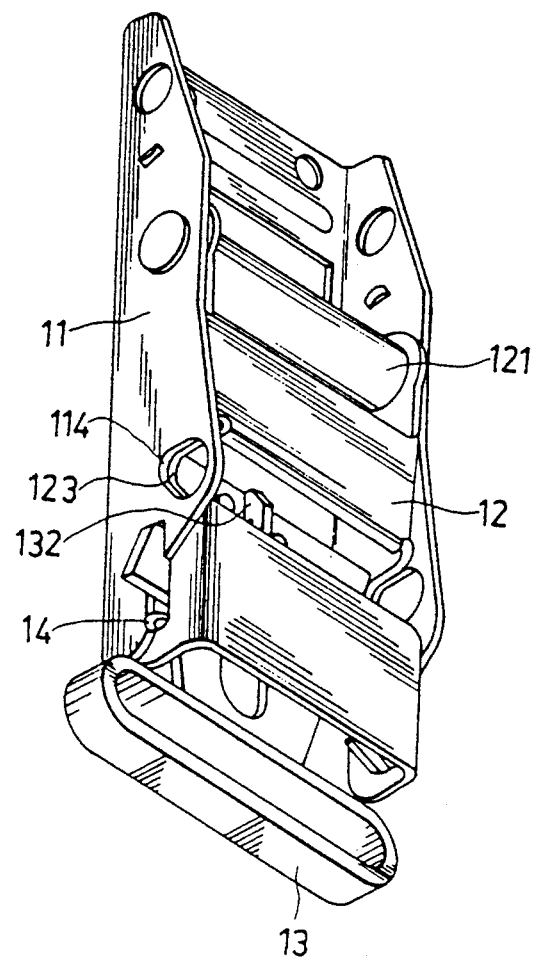
FIG. 1 is a perspective view of a conventional band retaining unit.
Figure 2:
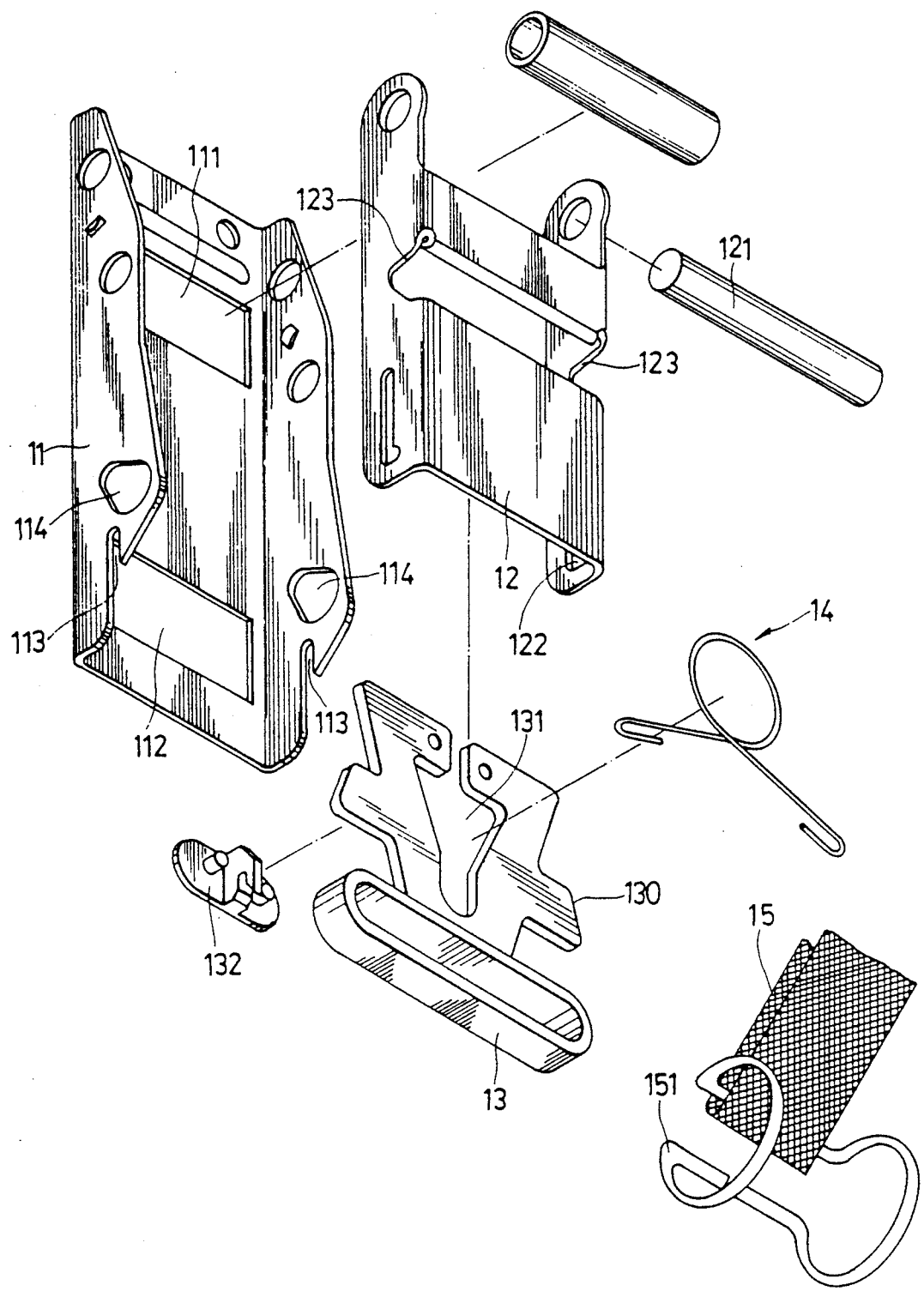
FIG. 2 is an exploded view showing the conventional band retaining unit.
Figure 3:
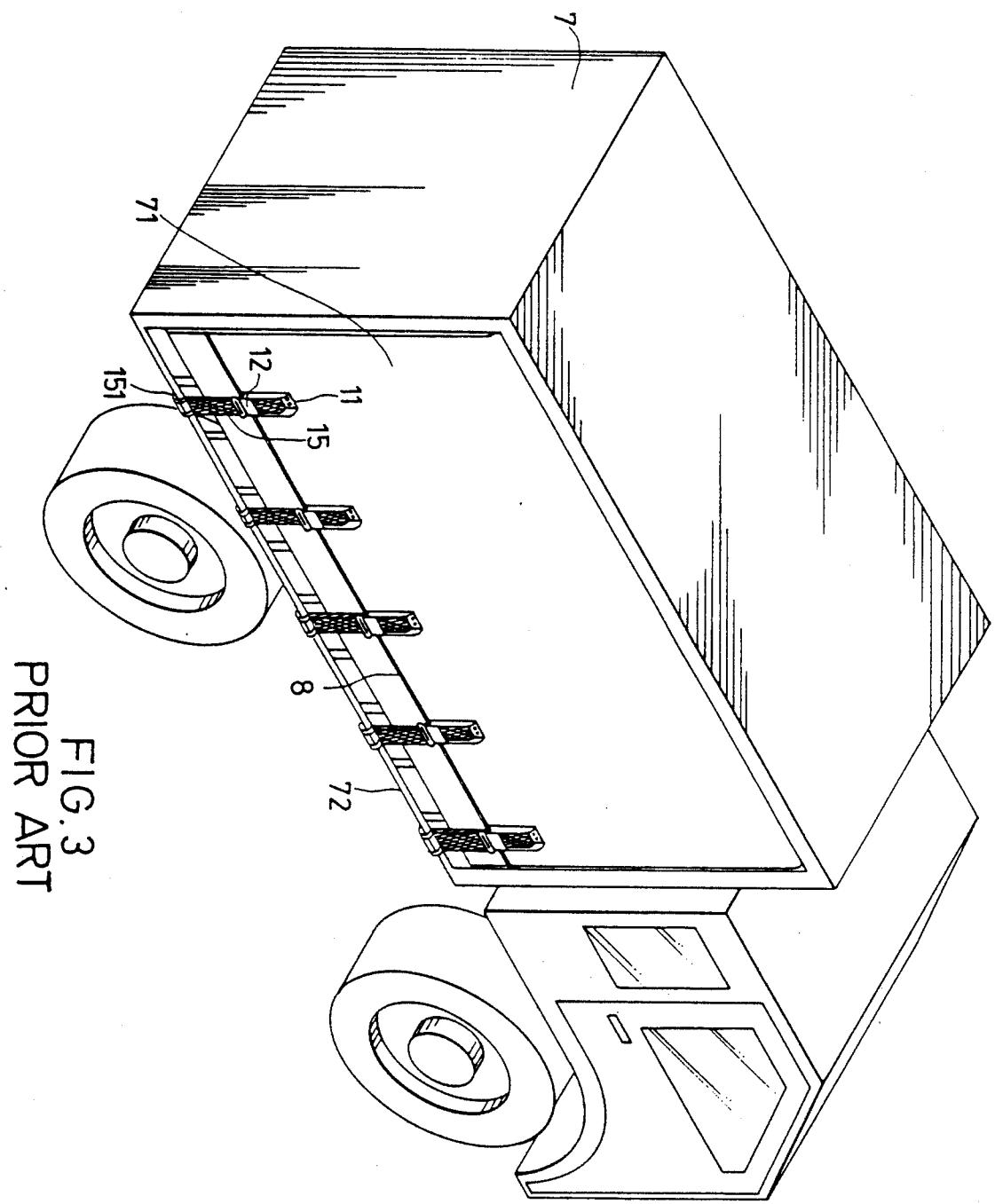
FIG. 3 is a schematic view illustrating the use of the conventional band retaining unit.

The gripping element 4 includes two engagement arms 41, between which a generally triangular gap 42 is defined, and a projection 43 (see FIG. 7) extending therefrom. When a rope (not shown) is passed through the rope holes 23 of the female retaining body 2 and into the depressions 33 of the male retaining body 3 for the purposes of confining the male retaining body 3 between the rope and the female retaining body 2, the projection 43 is positioned immediately above the rope, so that the projection 43 is obstructed by the rope and cannot move relative to the female retaining body 2. The engagement of the arms 41 within the gripping notches 22 forms a first lock of the male retaining body 3 on the female retaining body 2. The extension of the rope through the rope holes 23 forms a second lock. The obstruction of the rope to the projection 43 forms a third lock. Accordingly, the male retaining body 3 can be locked firmly on the female retaining body 2.

The two ends of the spring element 5 are fixed in the lower ends 321 of the slide slots 32 in the male retaining body 3. The remaining part of the spring element 5 is positioned between the engagement arms 41 of the gripping element 4, so as to bias the engagement arms 41 of the gripping element 4 to engage within the gripping notches 113. The spring element 5 can prevent separation of the engagement arms 41 of the gripping element 4 from the slide slots 32 of the male retaining body 3.

A retaining band 6 is fastened at an end thereof to a retaining hook 61 (see FIG. 5), which is held on a rail (not shown). Referring to FIG. 6, the retaining band 6 extends along the following paths:

(1) a first path extends from the retaining hook 61 into the band retaining unit through the lowermost large hole 21 of the female retaining body 2.
(2) a second path extends around the pivot 31.
(3) a third path extends out of the band retaining unit through the upper opening 34 of the male retaining body 3.
(4) a fourth path extends into the band retaining unit through the lower opening 35 of the male retaining body 3.
(5) a fifth path extends around the pivot 31.
(6) a sixth path extends out of the band retaining unit through the slot 44 of the gripping element 4.

When the free end of the male retaining body 3 is engaged within the free end of the female retaining body 2 and the engagement arms 41 of the gripping element 4 are engaged within the gripping notches 22, the female retaining body 2 and the male retaining body 3 press the retaining band 6 against the pivot 31, so as to prevent the retaining band 6 from moving in the band retaining unit.

When the user desires to tauten the portion of the retaining body 6 between the band retaining unit and the retaining hook 61, the rope is removed from the band retaining unit and the retaining band 6 is pulled downward. The downward pull to the retaining band 6 disengages the engagement arms 41 of the gripping element 4 from the gripping notches 22 of the female retaining body 2. After the portion of the retaining band 6 between the band retaining unit and the retaining hook 61 has been tautened, the retaining band 6 is released, so as to return the gripping arms 41 of the gripping element 4 into the gripping notches 22 of the female retaining body 2 with the assistance of the spring element 5.

With this invention thus explained, it is apparent that numerous modifications and variations can be made without departing from the scope and spirit of this invention. It is therefore intended that this invention be limited only as indicated in the appended claims.

I claim:

1. A band retaining unit including a female retaining body, a male retaining body connected pivotally to said female retaining body, a gripping element and a spring element, each of said male retaining body and said female retaining body being generally U-shaped and having a free end, a base wall and two parallel side walls; said male retaining body being capable of being rotated to engage said free end of said male retaining body within said free end of said female retaining body so as to clamp tightly a first end portion of a retaining band between said male retaining body and said female retaining body; the other end portion of said retaining band being adapted to be fastened to a first article, said retaining band being tautened at a portion thereof between said band retaining unit and said first article; said female retaining body being adapted to be mounted securely on a second article and including two gripping notches formed in said side walls of said female retaining body, and two aligned rope holes formed through said side walls of said female retaining body; said male retaining body including two slide slots formed through said side walls of said male retaining body in alignment with said retaining notches of said female retaining body, two depressions formed in said side walls of said male retaining body in alignment with said rope holes of said female retaining body, so that a rope can be passed through said rope holes of said female retaining body and into said depressions of said male retaining body in order to confine said male retaining body between said rope and said female retaining body, and a gripping element having two engagement arms disposed respectively and slidably within said slide slots; said spring element being disposed between said side walls of said male retaining body so as to push said engagement arms of said gripping element into said gripping notches of said female retaining body, thereby ensuring engagement of said free end of said male retaining body within said free end of said female retaining body; characterized in that said gripping element includes a projection extending therefrom which is positioned so as to be obstructed by said rope from moving in said band retaining unit, and said spring element has a portion which is positioned between said engagement arms of said gripping element, so as to prevent separation of said engagement arms of said gripping element from said slide slots of said male retaining body.

* * * * *